Nov. 16, 1926.
C. M. LAFFOON
1,607,287
HIGH FREQUENCY ALTERNATOR
Filed June 26, 1923
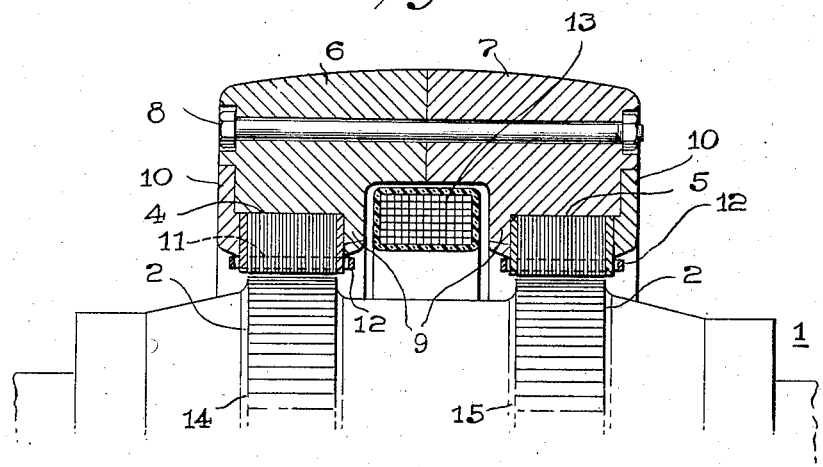
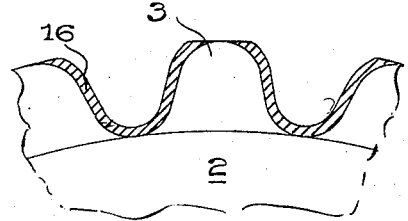
INVENTOR
Carthrae M. Laffoon
BY
Wesley Sloan
ATTORNEY

Patented Nov. 16, 1926.

1,607,287

UNITED STATES PATENT OFFICE.

CARTHRAE M. LAFFOON, OF IRWIN, PENNSYLVANIA, ASSIGNOR TO WESTINGHOUSE ELECTRIC & MANUFACTURING COMPANY, A CORPORATION OF PENNSYLVANIA.

HIGH-FREQUENCY ALTERNATOR.

Application filed June 26, 1923. Serial No. 647,843.

My invention relates to high-frequency alternators and in particular to high-frequency alternators of the inductor type.

The object of my invention is to improve the performance of alternators of the type described above through the provision of a novel kind of damper winding.

More specifically, the object of my invention is to provide an inductor having a highly effective damper winding consisting of an electrodeposit of conducting material upon the inductor.

The rotor flux of inductor type alternators has a tendency to pulsate, by reason of the reaction of the single phase armature currents and of the open slots in the stator core. The pulsating flux is damped out by eddy currents in the polar projections and in the main body of the rotor. Because of the high frequency of the eddy currents they are crowded in the external surface of the rotor resulting in large energy losses and possible overheating of the same. It is, therefore, essential to have a damper winding, although it is generally difficult, and in some cases impossible, to provide a damper winding on the high speed inductors of proper dimensions to be capable of fulfilling the requirements of an efficient damper winding.

I have found that, by electroplating the part of the rotor carrying the polar projections with conducting material of relatively low resistance, a damper winding may be obtained which is mechanically self-supporting and presents electrically an ideal solution of the problem. It may be readily applied to any form of rotor and the problem of support is eliminated without impairing the strength of either part. I have further found, that such damper winding may be used on other machines which present problems similar to that of an inductor of a high frequency generator.

My invention will be best understood by reference to the accompanying drawing, wherein—

Figure 1 is a view in vertical section of the upper half of a high-frequency alternator embodying my invention.

Fig. 2 is a fragmentary enlarged view illustrating the outline of the polar projections of the rotor.

Referring to Fig. 1, a rotor 1 of solid magnetic material is provided with cylindrical portions 2, carrying a plurality of polar projections 3. The shape of the polar projections is more clearly shown in Fig. 2 and is determined by the requirement that the wave of the voltage generated in the alternating current winding upon the stator shall have a desired form.

The rotor is surrounded by two magnetic cores 4 and 5 supported in a frame of magnetic material consisting of two halves 6 and 7, which are mutually secured, by means of bolts 8. The magnetic cores consist of laminated material and are clamped together between a flange 9, extending from the stator frame, and a retaining ring 10. Slots 11 are provided in the faces of the laminated core adjacent to the cylindrical portion of the inductor and they carry an armature winding 12, which may be of any suitable type. The exciting flux of the generator is supplied from the exciting winding 13 mounted between the stator members.

The rotation of the polar projections 3, causes pulsations of the flux through the armature teeth and induces thereby an alternating voltage in the armature winding 12. With no load connected to the generator the flux pulsations are restricted to the laminated portion of the stator; the open construction of the stator slots causes also a slight fluctuation of the flux in the tips of the polar projections 3.

Upon connecting the generator to a load, a single phase current flows through the armature winding and induces thereby an alternating flux through the solid portion of the stator and the rotor. In order to reduce the pulsations caused by the armature currents and also that caused by the open slots of the stator, the cylindrical rotor portions 2 carrying the polar projections 3 are provided with coatings 14 and 15 of conducting material such as copper, which serve as damper windings. These damper windings are obtained by electroplating the inductor and do not require any additional support. I have found that in actual machines, a coating five thousandths of an inch thick, has approximately half the cross section of the copper used in the alternating current armature winding and results in an almost complete elimination of the losses caused by flux pulsations in the magnetic body of the rotor.

The high operating speed of the rotor and the open shape of the slots between the polar projections 3 of the rotor make it very difficult, if not impossible, to employ any other kind of damper winding without impairing the performance of the machine.

The application of the above described type of damper winding is obviously not limited to high frequency machines, but may be applied to machines of any type, wherein another kind of damper winding would not be possible. The copper coating may either extend over the whole portion surrounding the polar projections as shown in 16, Fig. 2, or it may be arranged according to the particular requirement of the machine.

I do not desire to be limited to the precise details shown herewith and wish to cover by the following claims all modifications within the spirit of my invention.

I claim as my invention:

1. A dynamo-electric machine having a stator, and a rotor adapted to be driven at high speed and having a plurality of integral salient poles, said rotor having a damper means thereon comprising an adherent conductive electroplate surrounding said poles and forming a closed electric circuit therearound.

2. A dynamo-electric machine comprising a stator and a rotor adapted to be driven at high speed and having a lamellar damper means adherent thereto comprising an electroplate of copper having a thickness less than 0.010 inches.

3. The combination with a high-frequency alternator of the type comprising a stator, an induced winding on said stator and an inductor of solid magnetic material rotated at high speed with respect to said stator for generating a high-frequency current in said winding, a layer of conducting material adheringly united to the surface of said inductor to constitute an electric winding.

4. In a high-frequency alternator of the type comprising a stator, an induced winding on said stator, and a high-speed inductor having polar projections cooperating with said stator to induce high-frequency currents in said winding, a damper winding comprising an electroplate of highly conducting material adheringly united to the surface of said inductor adjacent to said polar projections.

In testimony whereof, I have hereunto subscribed my name this 22nd day of June, 1923.

CARTHRAE M. LAFFOON.